United States Patent [19]

Freudenschuss et al.

[11] 4,148,566
[45] Apr. 10, 1979

[54] MOTION-PICTURE CAMERA ACCOMMODATING SILENT-FILM AND SOUND-FILM CASSETTES

[75] Inventors: Otto Freudenschuss; Otto Kantner; Peter Révy von Belvárd, all of Vienna, Austria

[73] Assignees: Karl Vockenhuber; Raimund Hauser, both of Vienna, Austria

[21] Appl. No.: 759,899

[22] Filed: Jan. 17, 1977

Related U.S. Application Data

[63] Continuation of Ser. No. 669,085, Mar. 22, 1976, Pat. No. 4,003,643, which is a continuation-in-part of Ser. No. 460,136, Apr. 11, 1974, abandoned.

[30] Foreign Application Priority Data

Apr. 16, 1973 [AT] Austria .............................. 3383/73

[51] Int. Cl.² ........................................... G03B 31/02
[52] U.S. Cl. ...................................... 352/27; 352/14; 352/72
[58] Field of Search ........................ 352/72, 27, 29, 14

[56] References Cited

U.S. PATENT DOCUMENTS 3,957,363  5/1976  Hayashi .............................. 352/72

Primary Examiner—Monroe H. Hayes
Attorney, Agent, or Firm—Montague & Ross

[57] ABSTRACT

The housing of a motion-picture camera has a cassette-receiving space into which at least one feeler projects to detect the insertion of a sound-film cassette differing in shape from a silent-film cassette. With both types of cassettes the film is intermittently transported past an image gate by a traction claw; in the case of a sound-film cassette a portion of the film downstream of the image window is accessible for engagement by a constant-speed feeder in the vicinity of a sound-recording head. The feed rate of the traction claw is stabilized by a centrifugal governor in the presence of a silent-film cassette; upon sensing a sound-film cassette, the feeler deactivates the governor and synchronizes the claw drive with the constant-speed feeder under the control of a mechanism, such as a loop detector, which measures the length of film between the image gate and the recording head.

5 Claims, 10 Drawing Figures

FIG. 1A
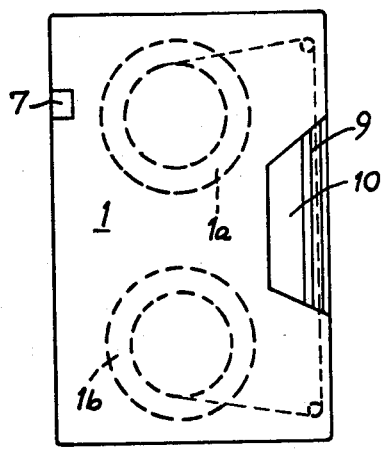
FIG. 1B
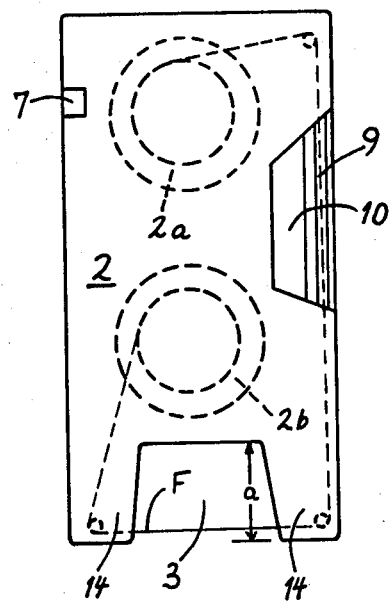
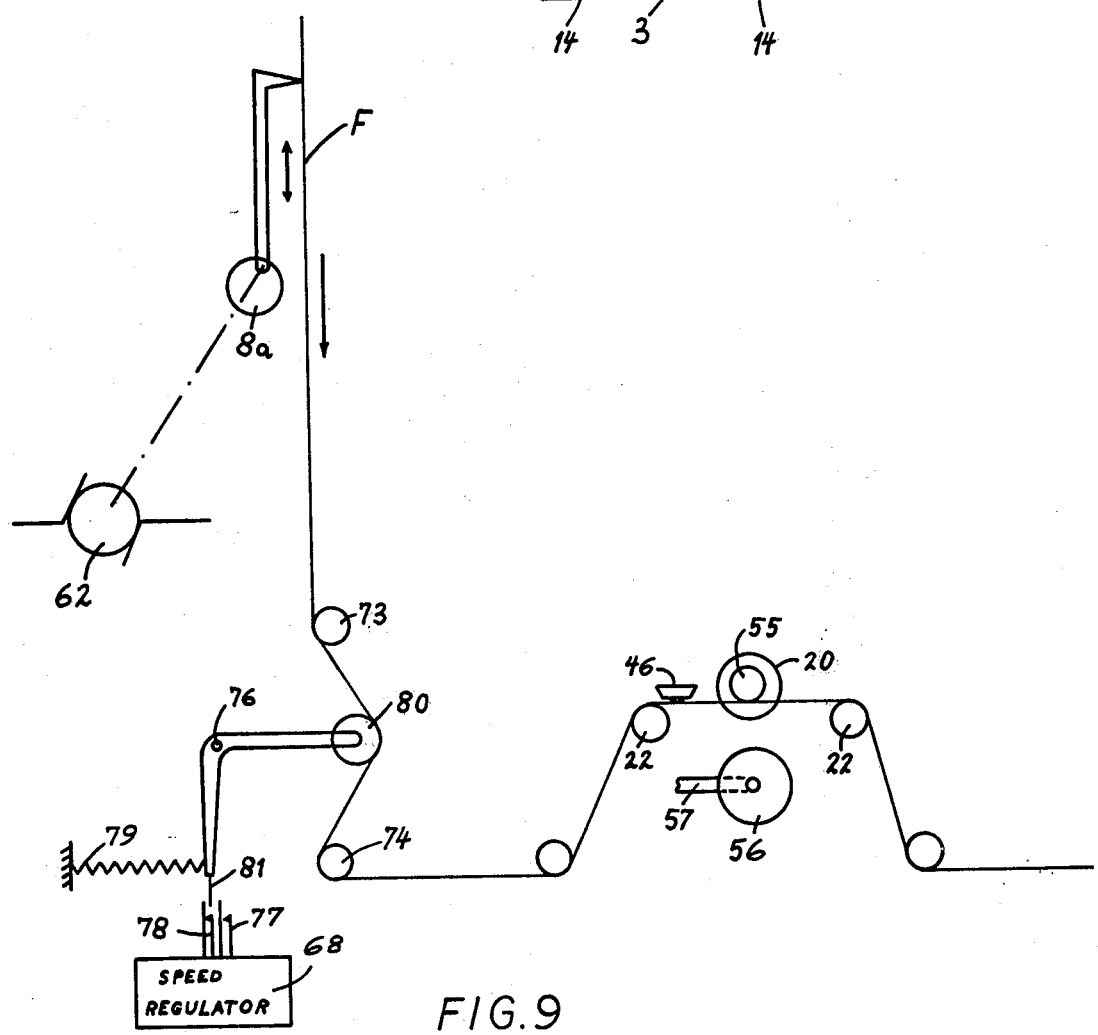
FIG. 9

MOTION-PICTURE CAMERA ACCOMMODATING SILENT-FILM AND SOUND-FILM CASSETTES

CROSS REFERENCE TO RELATED APPLICATION

This is a continuation of application Ser. No. 669,085, filed Mar. 22, 1976, now U.S. Pat. No. 4,003,643, which was a continuation-in-part of our copending application Ser. No. 460,136 filed Apr. 11, 1974, now abandoned.

FIELD OF THE INVENTION

Our present invention relates to a motion-picture camera adapted to be alternatively used with silent films and sound films contained in respective cassettes, the two types of cassettes differing in shape from each other.

BACKGROUND OF THE INVENTION

Conventional cine-film cassettes contain a winding reel and an unwinding reel between which the film is accessible at one location in the case of a silent-film cassette and also at a second location, downstream from the first one, in the case of a sound-film cassette. The upstream access serves for the illumination of successive film frames during exposure, as the film is intermittently transported past an image gate behind an objective, whereas the downstream access enables the juxtaposition of a sound track on the film with a recording head.

Since the intermittent motion of the film in the vicinity of the image gate must be converted into a steady one at the recording head, it is desirable to provide separate feed mechanisms at the two locations, such as a reciprocating traction claw and a continuously rotating sprocket wheel. When the constant-speed feed mechanism is operative, i.e. in the presence of a sound-film cassette, proper synchronization of the two drives becomes a problem.

OBJECTS OF THE INVENTION

The general object of our present invention, therefore, is to provide simple and effective means for insuring such synchronization in a motion-picture camera of the type referred to.

An ancillary object is to provide means in such a camera for effectively discriminating between two types of cassettes, namely those of the silent-film type and those of the sound-film type, for the purpose of deactivating the synchronization means in the absence of a cassette of the second type.

SUMMARY OF THE INVENTION

In accordance with our present invention, a camera designed for alternatively exposing silent film and sound film in respective cassettes includes first feed means in a cassette-receiving chamber, engageable with the film of either type of cassette at its upstream location for intermittently transporting same past the confronting image gate, and second feed means in that chamber engageable with the film of a sound-film cassette at its downstream location for transporting same at a substantially constant speed past a sound-recording unit. The drive means for these two feed means include a motor, operatively coupled with the first feed means, whose speed is stabilized by a first speed regulator such as a centrifugal governor with a cassette of the first type, i.e. one containing a film without sound track. A second speed regulator, designed to control the speed of that motor to maintain a substantially constant length of film between the upstream and downstream locations, can be substituted for the first speed regulator by switchover means responsive to sensing means in the camera casing, adapted to detect the shape of an inserted cassette, whenever that cassette is of the second type, i.e. one containing a film with sound track. A sound-film cassette used in a camera according to our invention may be longer than a silent-film cassette, being provided with a pair of lateral extensions or legs between which the film stretches free of any supporting surface. The space between the legs may accommodate both the recording unit and the second feed means. Advantageously, the sensing means comprises a pair of feelers flanking the second feed means so as to be engageable by the two legs of a sound-film cassette upon insertion thereof into the camera casing, preferably at a location close to the cassette body whereby the same feelers can act as stops engaging an edge of a legless silent-film cassette inserted into the casing. For this purpose the feelers may have coplanar, spring-loaded webs normally projecting into the cassette-receiving chamber of the casing.

BRIEF DESCRIPTION OF THE DRAWING

The above and other features of our invention will now be described in detail with reference to the accompanying drawing in which:

FIGS. 1A and 1B are face views of a silent-film cassette and a sound-film cassette, respectively, adapted to be used in a motion-picture camera according to our invention;

FIG. 9 is a schematic view of the film path in a camera equipped with the speed-regulating circuit of FIG. 8.

SPECIFIC DESCRIPTION

Figure 2:
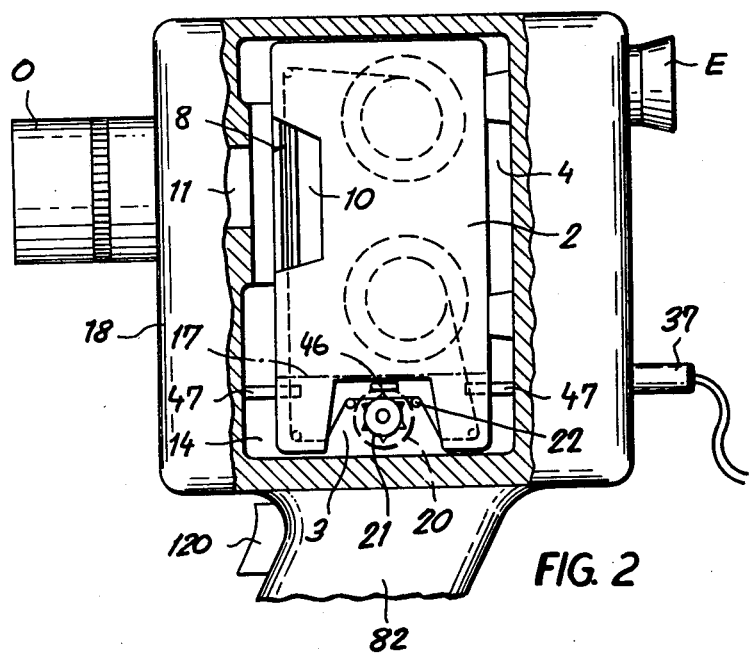
FIG. 2 is a side view, partly broken away, of a camera according to our invention loaded with a cassette of the type shown in FIG. 1B.

In FIG. 1A we have shown a silent-film cassette 1 containing a supply spool 1a and a takeup spool 1b for a film F. The cassette has a notch 7 engageable by a nonillustrated spring-loaded detent such as a ball check in the casing of a cine camera 18 (FIG. 2), the camera having a chamber 4 for receiving either the cassette 1 or a sound-film cassette 2 illustrated in FIG. 1B. Each cassette is provided with a backing plate 9 for the film F, disposed in a cutout 10 of its body.

Sound-film cassette 2 differs from silent-film cassette 1 by the presence of a pair of lateral extensions or legs 14, the height of this cassette thus exceeding that of cassette 1 by the length a of these legs. The film F travels from a supply spool 2a to a takeup spool 2b by way of cutout 10, representing an upstream access location, and a recess 3 bracketed by the legs 14, this space constituting a downstream access location. The film F thus extends freely across the recess 3 so as to co-operate, on the one hand, with a recording head 46 (FIG. 2) and, on the other hand, with a feed mechanism represented in FIG. 2 by a sprocket 21 driven at substantially constant speed by a motor 20. To engage the perforations of film F with the teeth of the sprocket, the cassette 2 is inserted into the reception chamber 4 of the camera in a slightly tilted position, legs first, with the unsupported part of film F intercepted by a pair of rods 22 just below the recording head 46. As the cassette is thrust down to let its legs come to rest against the chamber bottom, the film F is deflected to assume the position shown in FIG. 2. The upper part of the cassette can then be pushed in for indexing by the aforementioned detent in its upright position whereupon a nonillustrated lid or door can be closed.

In this inserted position, cutout 10 confronts an image gate 11 in line with the camera objective O. The camera in further shown provided with an eyepiece E and a handle 82 equipped with the usual release button or trigger 120; handle 82 may contain the batteries for powering the motor 20 as well as the drive of a reciprocating transport claw 8 engageable with the film perforations in the vicinity of image gate 11 as is well known per se.

Figure 3:
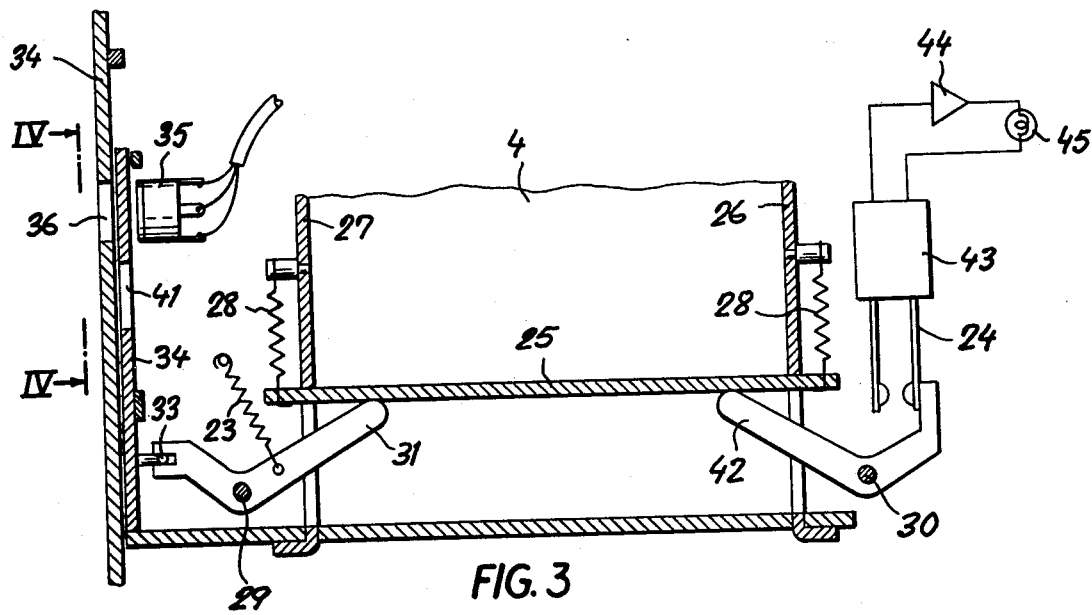
FIG. 3 is a somewhat diagrammatic sectional view, drawn to a larger scale, of a modified lower part of the camera shown in FIG. 2.

A nonillustrated microphone may be connected to recording head 46 via a plug 37 receivable in a jack 35 (FIG. 3).

A sensing mechanism, designed to detect the presence of a sound-film cassette 2 in chamber 4, comprises a pair of feelers 47 more fully illustrated in FIGS. 5-7 described hereinafter. The feelers 47, projecting from the rear into the chamber 4, are repressed against respective biasing springs 50 (FIGS. 6 and 7) by the legs 14 when the cassette 2 is inserted in the aforedescribed manner. If, on the other hand, the camera is loaded with a silent-film cassette 1, whose lower edge lies at a level 17 just above the feelers 47, these feelers are not pushed back but help support the cassette 1 in the camera casing.

An alternate sensing mechanism has been illustrated in FIG. 3 where the receiving chamber 4 is laterally bounded by a pair of sidewalls 26, 27 and is provided with a vertically movable bottom plate 25 guided in slits of these sidewalls. Plate 25 is suspended by a pair of springs 28 tending to maintain it in its illustrated elevated position.

Two feelers 31 and 42, replacing the feelers 47 of FIG. 2, are designed as bell-crank levers pivotable about respective fulcra 29, 30 and are held onto the underside of plate 25 by a coil spring 23 and a contact spring 24, respectively. Spring 24 forms part of a switch 43 which is closed upon a lowering of plate 25 to supply current from a nonillustrated source, such as a power pack in handle 82, via an amplifier 44 to a signal lamp 45 and to the recording head 46 of FIG. 2.

A slide 32, linked via a pin 33 with lever 31, normally obstructs an opening 36 in a wall 34 of the camera casing aligned with the microphone jack 35. Thus, the plug 37 of FIG. 2 cannot be inserted into the jack as long as the plate 25 is in its illustrated elevated position which it maintains when the camera is loaded with the shorter silent-film cassette 1 shown in FIG. 1A. If, on the other hand, the longer sound-film cassette 2 of FIG. 1B is introduced into the chamber 4, feeler 31 swings clockwise about its fulcrum 29 and raises the slide 32 into a position in which an aperture 41 thereof registers with the opening 36 to permit insertion of the plug 37. At the same time, the sound-recording unit including head 46 is energized by the switch 43, closed by a counterclockwise swing of feeler 42 about its fulcrum 30, and signal lamp 45 is lit to indicate this condition.

Figure 4:
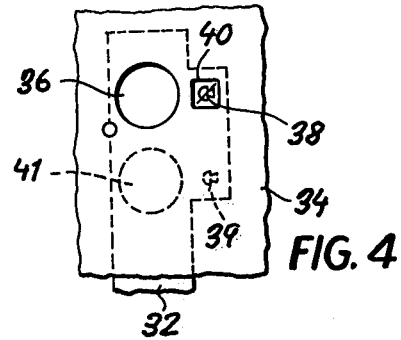
FIG. 4 is a fragmentary side view taken on the line IV—IV of FIG. 3.

As shown in FIG. 4, slide 32 also carries symbols 38 and 39 which are alternately visible through a window 40 in wall 34 to indicate the absence or the presence of a sound-film cassette within the camera.

Figure 6:
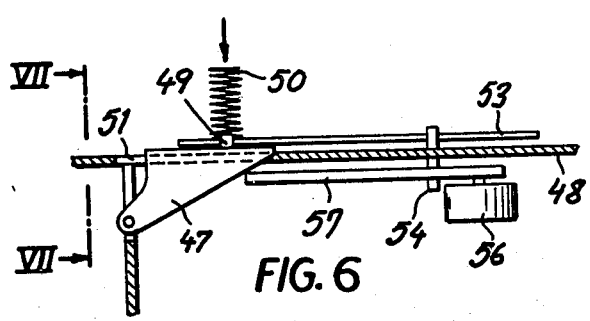
FIG. 6 is a top view of the assembly of FIG. 5.
Figure 5:
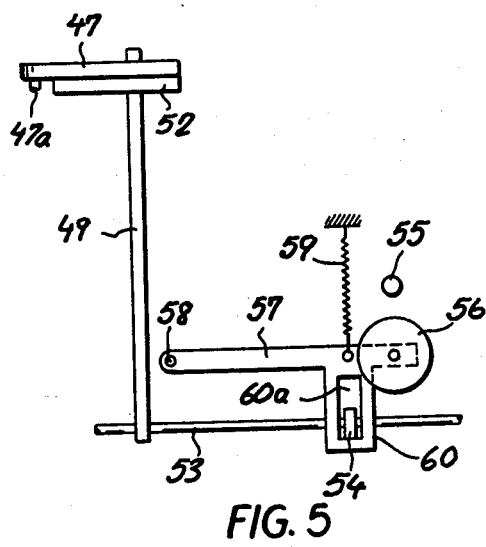
FIG. 5 is a diagrammatic elevational view of a constant-speed film-feeding mechanism adapted to be used in the camera of FIG. 2.
Figure 7:
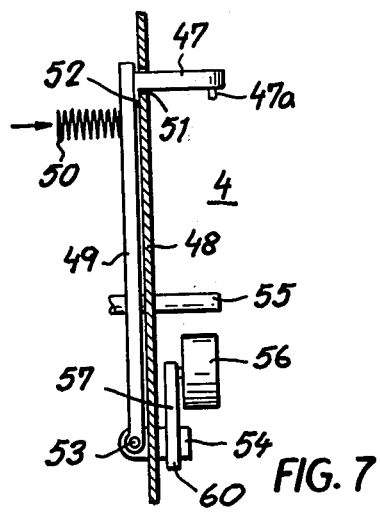
FIG. 7 is a sectional side view taken on the line VII—VII of FIG. 6.

In FIGS. 5–7 we have shown another feed mechanism for moving the film F across the recess 3 between legs 14 (FIGS. 1B and 2) at substantially constant speed while the recording head 46 is in operation. The two feelers 47, only one of which has been illustrated in these Figures, extend through slots 51 in a rearwall 48 of chamber 4 (omitted in FIG. 5 for the sake of clarity) and are pivoted on fixed fulcra 47a in the sidewalls of chamber 4. Each feeler is in the shape of a flat shelf, adapted to support a corner of a silent-film cassette 1 as mentioned above, and has a depending skirt 52 normally resting against the back surface of rear wall 48 under the pressure of the corresponding spring 50 which acts upon the feeler through a respective upright arm 49 rigid with a horizontal shaft 53. This shaft, journaled in nonillustrated bearings, carries a lug 54 which passes through an opening in wall 48 and engages in a slot 60a in an extension 60 of a lever 57 which is swingable about a fixed fulcrum 58. The free end of lever 57 carries a pinch roller 56 coacting with a capstan 55 which is continuously driven by the motor 20 (FIGS. 2 and 9) when the sound-recording unit is in operation, the capstan 55 replacing the sprocket 21 of FIG. 2. A tension spring 59 tends to swing the lever 57 counterclockwise, as viewed in FIG. 5, thereby elevating the pinch roller 56 toward the capstan 55 from which it is normally spaced as shown. The force of spring 59, however, is overcome by that of the two springs 50 acting through their respective arms 49, shaft 53 and lug 54 upon lever 57 as long as the feelers 47 are not repressed by the legs 14 of a cassette 2 inserted into the chamber 4. Thus, the separation of capstan 55 from pinch roller 56 facilitates the introduction of the film F into the intervening gap during the loading of the camera. Upon the completion of the loading operation, lug 54 is swung counterclockwise (FIG. 7) to unlock the lever 57 whereby the roller 56 is pulled up by spring 59 to press the film against the rotating capstan 55 so that the film is transported past the recording head 46 (FIG. 2) as soon as a switch 172 (FIG. 8) is closed by a squeezing of the trigger 120. The energization of the capstan drive coincides with the supply of energy to a drive motor 62 for the transport claw 8 as described below with reference to FIGS. 8 and 9.

Figure 8:
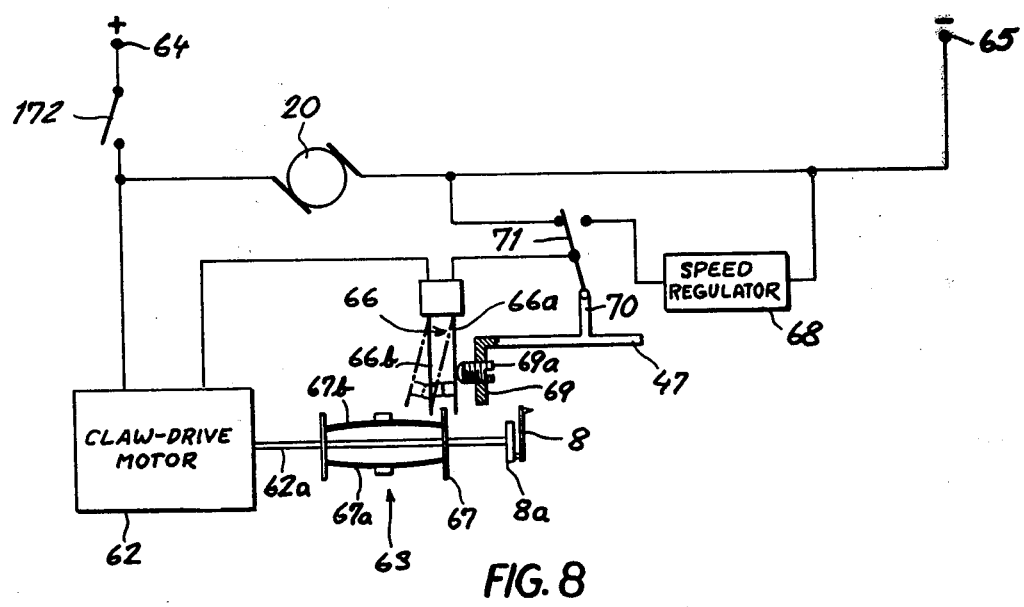
FIG. 8 is a diagram of a speed-regulating circuit for a camera according to our invention.

As shown in FIG. 8, claw-drive motor 62 is connected in parallel with capstan-drive motor 20 across the power supply represented by terminals 64 and 65, the circuits for both motors being closable by the trigger-operated switch 172. Motor 62 lies in series with a switch 66, forming part of a centrifugal governor 63, and with a further switch 71 which is mechanically coupled with an extension 70 of one of the cassette feelers 47. These feelers, or one of them, may also control a nonillustrated switch in series with motor 20 which is opened when no sound-film cassette is inserted into the camera.

Governor 63 comprises a pair of weighted leaf springs 67a, 67b which are interconnected by a ring 67 and are mounted on a shaft 62a of motor 62 carrying an eccentric 8a to which the transport claw 8 is articulated. As soon as the shaft speed reaches a predetermined limit, springs 67a and 67b flex sufficiently to draw the ring 67 into engagement with a contact 66b of switch 66, separating it from its companion contact 66a and breaking the circuit. Thus, the speed of motor 62 and therefore the average feed rate of the film by the claw 8 is stabilized as is well known per se.

The mode of operation just described is suitable only for silent-film operation, i.e. when no other part of the film is simultaneously driven at substantially constant speed by the motor 20 via the sprocket 21 of FIG. 2 or the capstan 55 of FIGS. 5, 7 and 9. For sound-film operation, the absence of correlation between the centrifugal governor 63 and the non-illustrated speed control of motor 20 would tend to damage the film by either overstressing it or causing it to balloon out of the recess 3. It is for this reason that, in accordance with our present invention, we provide the feeler-controlled switchover means 71 which reverses its position whenever the feeler 47 is repressed by an inserted sound-film cassette 2 as discussed above. The same feeler motion deactivates the centrifugal governor 63 by displacing a stud 69a on an extension 69 of the feeler into engagement with switch contact 66a whereby the two contacts 66a, 66b are jointly deflected beyond the reach of ring 67 so that switch 66 remains closed with any operating speed of motor 62. At the same time, the armature of switch 71 connects the motor 62 to terminal 65 by way of a speed regulator 68 designed to maintain a substantially constant length of film between the claw 8 and the capstan 55 (or the sprocket 21), the motor 62 being thus slaved to the motor 20.

Speed regulator 68 may comprise any device capable of measuring the length of the stretch of film lying between cutout 10 and recess 3, e.g. by counting the number of perforations in that stretch. As particularly illustrated in FIG. 9, this regulator includes a detector for a loop formed by the film F between two deflecting rollers 73 and 74, the detector comprising a bell-crank lever 75 pivotable about a fixed fulcrum 76 and coacting with two switches 77, 78. A spring 79 engages one end of lever 75 to urge a roller 80 on its opposite end into contact with the film F between rollers 73 and 74, the lever oscillating slightly about its fulcrum as the film loop tightens and slackens. Excessive tension, indicative of an insufficient claw speed, swings the lever 75 counterclockwise whereby a spur 81 thereof closes the normally open switch 77 which may short-circuit a resistance in series with the motor circuit to accelerate the rotation of eccentric 8a. Conversely, excessive slackening of the film loop lets the lever 73 swing clockwise to open the normally closed switch 78 with the opposite effect of decelerating the motor.

Within the limits of compatibility, features from different embodiments herein disclosed may be combined with or substituted for one another. Thus, for example, stud 69a in FIG. 8 could be carried on an extension of one of the feelers 31, 42 shown in FIG. 3.

We claim:

1. A motion-picture camera capable of selectively utilizing both sound-film cassettes and silent-film cassettes, different in size from each other, and provided with a synchronous recording system, comprising:
   a cassette chamber adapted to receive a selected cassette;
   means for detecting the type of a cassette selected by sensing the size of a film cassette loaded within said cassette chamber;
   drive means for driving a film in such film cassette loaded within said cassette chamber for a photographing operation;
   film-feed-speed-stabilizing means means coupled to said drive means for setting one of two different modes of speed regulation for a film to be driven by said drive means; and
   control means for setting said camera to one of the modes of speed regulation which may be set by said film-feed-speed-stabilizing means when said sensing means detects a sound-film cassette loaded within said camera, such mode of speed regulation being suited for permitting normal photographing of a sound film in conjunction with synchronous sound recording.

2. A motion-picture camera capable of utilizing both sound-film cassettes and silent-film cassettes differing in size from each other, comprising:
   a casing forming a chamber adapted to receive a selected cassette;
   sensing means in said casing for determining the type of a selected cassette, inserted into said chamber, from the size thereof;
   drive means in said casing for transporting a film of an inserted cassette past an image gate for photographic exposure, said casing containing a recording head past which the film is moved by said drive means upon insertion of a sound-film cassette into said chamber;
   speed-stabilizing means coupled with said drive means for alternately establishing a first mode and a second mode of speed regulation for the film of an inserted cassette, said second mode being compatible with synchronous photographic exposure and sound recording; and
   control means responsive to said sensing means for operating said speed-stabilizing means to establish said second mode of speed regulation to the exclusion of said first mode upon insertion of a sound-film cassette into said chamber.

3. A camera as defined in claim 2 wherein said drive means comprises a motor, said speed-stabilizing means including a centrifugal governor permanently coupled with said motor and contact means engageable by said governor in an energizing circuit for said motor, said contact means being displaceable by said control means beyond reach of said governor in the presence of a sound-film cassette.

4. A camera as defined in claim 3 wherein said speed-stabilizing means further comprises a speed regulator independent of said governor operatively connectable with said motor in the presence of a sound-film cassette.

5. A camera as defined in claim 4 wherein said speed regulator comprises a loop detector engageable with the film of a sound-film cassette.

* * * * *

UNITED STATES PATENT AND TRADEMARK OFFICE
CERTIFICATE OF CORRECTION

PATENT NO. : 4,148,566
DATED : April 10, 1979
INVENTOR(S) : Otto Freudenschuss et al.

It is certified that error appears in the above—identified patent and that said Letters Patent is hereby corrected as shown below:

The term of this patent subsequent of January 18, 1994 has been disclaimed.

Signed and Sealed this

Eleventh Day of March 1980

[SEAL]

Attest:

SIDNEY A. DIAMOND

Attesting Officer

Commissioner of Patents and Trademarks